United States Patent [19]

Shirane

[11] Patent Number: 4,538,894

[45] Date of Patent: Sep. 3, 1985

[54] WARNING DEVICE FOR CAMERAS

[75] Inventor: Hideto Shirane, Tokyo, Japan

[73] Assignee: Fuji Photo Film Co., Ltd., Kanagawa, Japan

[21] Appl. No.: 541,738

[22] Filed: Oct. 13, 1983

[30] Foreign Application Priority Data

Oct. 19, 1982 [JP] Japan ................................ 57-183362

[51] Int. Cl.³ ........................ G03B 17/18; G08B 19/00
[52] U.S. Cl. .................................... 354/467; 340/600; 340/692
[58] Field of Search ................ 354/289.1, 289.12, 467, 354/465, 484, 418; 381/51; 340/636, 692, 825.12, 600

[56] References Cited

U.S. PATENT DOCUMENTS 3,221,317 11/1965 Ferrigno ............................. 340/600
4,389,109 6/1983 Taniguchi et al. .................. 354/467
4,455,551 6/1984 Lemelson ............................ 340/692

Primary Examiner—L. T. Hix
Assistant Examiner—David M. Gray
Attorney, Agent, or Firm—Young & Thompson

[57] ABSTRACT

A warning device to be incorporated for giving a warning or attention-getting statement in synthesized human speech to call the attention of a photographer to the need to correct the condition of the camera. The warning device includes a power supply which is adapted to operate upon receiving a warning signal provided corresponding to the occurrence of a camera condition to be warned against and a delay circuit for delaying the warning signal. The power supply is adapted to allow the power supply to an amplifier connected between an acoustic signal generating circuit and a speaker immediately upon receiving the warning signal. The delay circuit directs the warning signal to the acoustic signal generating circuit with a certain delay time at least equal to the time in which the amplifier becomes stable in its operational state for the successful synthesis of acoustic signals. Thus, the amplifier is powered only during the period of delay plus the period of the synthesized speech, thereby to conserve the power of a battery while at the same time ensuring that the beginning of the synthesized speech will be audible.

5 Claims, 1 Drawing Figure

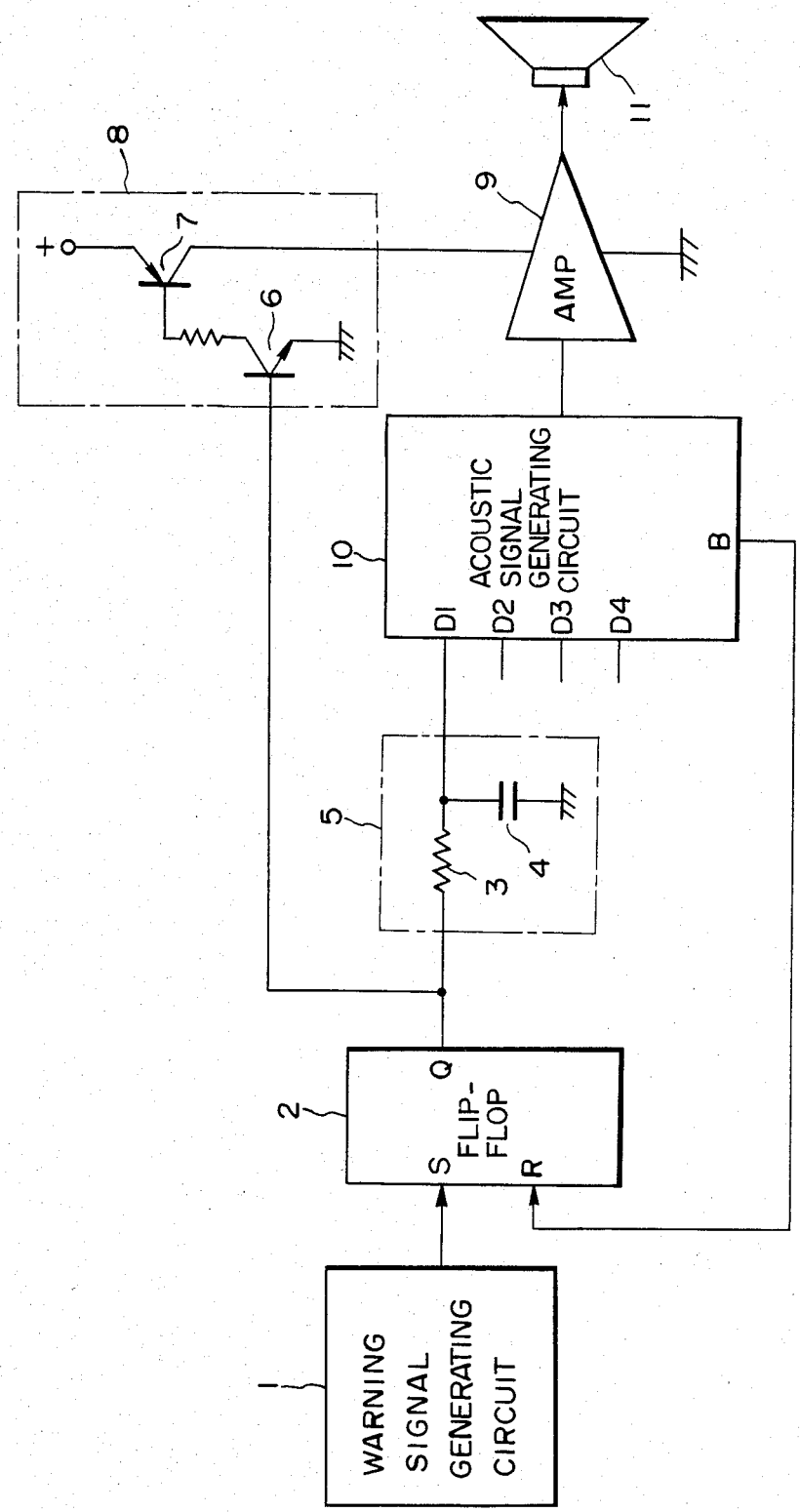

WARNING DEVICE FOR CAMERAS

BACKGROUND OF THE INVENTION

The present invention relates to a warning device to be suitably incorporated into cameras for giving warning statements in synthesized human voice or speech.

Recently, various kinds of automatic cameras have been provided for the purpose of the simple and easy operation of the camera without operational failures. In some of the latest automatic cameras, the operations of exposure and focus adjustments which are the most difficult camera operations are made automatically, enabling any photographer to take pictures only by operating a shutter release member. As to camera operations which are difficult to be made automatically or which render a camera costly due to the requirement of complicated mechanism and operation, it is desirable to make them manually. As the aforementioned operation, there may be exemplified a film loading operation, a preparatory operation for firing a strobe under conditions of subject brightness lower than that for the maximum exposure interval allowable for an exposure without incurring any adverse blurring effect from the normally expected hand motion of the photographer for a selected film speed and exposure aperture size, a changing operation of batteries or the like. When these operations are not carried out accurately and positively, photography results in a failure. For this reason, it is desirable to incorporate a warning device in a camera for giving the photographer warnings or calling attention that the camera condition or conditions should be corrected.

Generally, conventional warning devices incorporated in cameras give warnings or call attention by means of an illumination-producing device such as an LED arrangement or by means of a sound-producing device such as a speaker. These warning indications cannot make the photographer understood what is the camera condition to be corrected or adjusted.

There has recently been proposed a warning device built in a camera which is adapted to give a photographer specific voiced warnings. In such a camera, it is well known to utilize a voice synthesis circuit taking the form of a LS1 (large scaled integrated circuit) device due to the advantage of reduced current consumption thereof. The voice synthesis circuit operates to store in its non-volatile memory the information data in the form of digital signals separated for the respective specific warning statements or narrations to be given. When addressing the leading address of the data corresponding to the statement or narration by which warning is given of an operational condition, the data are sequentially retrieved for conversion into sound signals by means of an interpolating circuit and a sound generating circuit. Then the sound signals are simulated with a resonance characteristic of human vocal cords through a digital filter and subsequently converted into synthesized acoustic signals in the form of analogue signals by a D/A converter.

When providing such warning devices with synthesized human speech, one of the problems associated with the warning device is concerned with a malfunction characterized by failure of a speaker to be driven directly with acoustic signals from the acoustic signal generating circuit due to the feebleness thereof. For this reason, the amplification of the acoustic signals by an amplifier is essential for driving the speaker for satisfactorily imparting warning statements in synthesized human speech. On the other hand, there occurs a different problem in that continuous current supply to the amplifier is wasteful and hence causes the accelerated discharge of a battery. A solution to the aforementioned problem is to supply current to the amplifier only when required (that is, only when the acoustic signals are generated). Such a solution, however due to the fact that the amplifier includes a lot of capacitors with a large capacity which require a relatively long time to be charged up, may incur a delay in the starting operation thereof attributed to the charge-up time, resulting in that a warning statement in synthesized human speech given by a speaker is inaudible at the beginning.

SUMMARY OF THE INVENTION

Accordingly, it is a primary object of the present invention to provide a warning device to be incorporated in cameras for giving warning statements in synthesized human speech wherein an amplifier included therein is adapted to operate only when amplifying acoustic signals for the purpose of eliminating the wasteful consumption of battery current.

It is another object of the present invention to provide a warning device to be incorporated in cameras for giving warning statements in synthesized human speech wherein there occurs no delay in the starting operation of an amplifier included therein so as to provide hard clear warning statements in synthesized human speech.

It is still another object of the present invention to provide a warning device to be incorporated in cameras for giving warning statements in synthesized human speech which is simple in construction.

In achieving these and other objects in accordance with a preferred embodiment of the present invention, there is provided a warning device with a power supply means which is controlled with a warning signal to supply power to an amplifier only as required and a delay circuit which operates to direct the warning signal to an acoustic signal generating circuit with a certain delay time so as to cause the acoustic signal generating circuit to generate acoustic signals to be directed to the amplifier after the amplifier is in a steady state in operation.

BRIEF DESCRIPTION OF THE DRAWING

The foregoing and other objects will be further understood in view of the subsequent detailed description of a preferred embodiment of the invention which is set forth with reference to the attached drawing, in which the single FIGURE is a block diagram of a warning device embodying the present invention.

DETAILED DESCRIPTION OF THE INVENTION

Referring now in particular to the drawing showing a block diagram of one form of a warning device according to the present invention which is suitable to be incorporated in cameras to give a photographer warning or attention-getting statements in synthesized human voice or speech, the warning device includes a warning signal generating circuit 1 which, in turn, provides warning signals indicating such difficult or inconsistent conditions of a camera as insufficient subject brightness, exhaustion of film loaded in the camera or the like. The warning signal generating circuit 1 may take the form of a switch which is adapted to provide a warning signal in association with a film counter for the indication of the exhaustion of film or means comprising a subject brightness detecting circuit and a comparator for the indication of insufficient subject brightness which indicates that an artificial illumination source, for instance a strobe, should be used to make a proper or satisfactory film exposure.

The warning signal from the warning signal generating circuit 1 operates to set a flip-flop circuit 2 which initially assumes a low (binary logic 0) level of output signal upon being reset to provide a sufficiently high (binary logic 1) level of output signal at its output terminal Q, thus setting flip-flop circuit 2 latch the warning signal. The warning signal from the latch circuit, that is flip-flop circuit 2 is directed to both a delay circuit 5 comprising a resistor 3 and a capacitor 4 and a power supply circuit 8 mainly comprising transistors 6 and 7. The direction of the warning signal to the power supply control circuit 8 causes the transistor 6 and hence the transistor 7 to be conductive so as to allow power supply to an amplifier 9 which requires a relatively long time for attaining a substantial amplification factor because of, as is known well to those skilled in the art, a capacitor or capacitors with a large capacity included therein.

The delay circuit 5 is adapted to direct the warning signal from the flip-flop circuit 2 to an acoustic signal generating circuit 10 with a certain delay time at least equal to the time which is required for the amplifier 7 to attain a substantial amplification factor and to thereby become steady in its operational state. As is known well, the delay time of the delay circuit 5 can be predetermined by using a selected resistance value of resistor and a selected capacity of capacitor. The warning signal is then directed with that certain delay to the input terminal D1 of an acoustic signal generating circuit 10 for generating a series of synthesized acoustic signals which, in turn, is impressed onto a speaker 11 after the amplification by means of the amplifier 9, thereby giving the warning statement in human speech, for example, such a statement as "the film has run out" through the speaker 11. Because of the fact that the generation of the series of synthesized acoustic signals is delayed by means of the delay circuit 5 and on the other hand, the amplifier 9 has been ready for a proper operation prior to the reception of the series of synthesized acoustic signals, and so the series of synthesized acoustic signal from the beginning to the end can be satisfactorily amplified enough to drive the speaker 11 for giving the warning statement in human speech without any inaudible sound.

The acoustic signal generating circuit 10 is adapted to provide an end signal at the time the information signal corresponding to the warning statement required to be imparted is consequently retrieved from a memory in the acoustic signal generating circuit 10 and then output as the series of synthesized acoustic signals in the form of an analogue signal, the end signal being directed to the input terminal R of the flip-flop circuit 2 for the resetting thereof to change its output state from a high (binary logic 1) output signal level to a low (binary logic 0) output signal level. The change of the output state of the flip-flop to a low level causes the transistors 6 and 7 of the power supply circuit 8 to switch off the power supply to the amplifier 9.

In the warning device of the present invention, it becomes possible to give the photographer several kinds of warning statements in synthesized human speech by additionally providing a plurality of warning signal generating circuits, flip-flop circuits and delay circuits. Warning signals are directed by way of the delay circuit 5 to the input terminals D1, D2, D3 and D4 of the acoustic signal generating circuit respectively following sequential camera operations. The warning statement to be synthesized is determined depending on which input terminal the warning signal is directed to. As is well known in the art, the acoustic signal generating circuit 10 has retained the information in the form of digital signals which are synthesized as acoustic signals convertible into human statements corresponding to the respective information to be given, for example "make the strobe ready", "focus on the target", "the film has run out" or the like.

What is claimed is:

1. A warning device to be incorporated in a camera for giving warning statements in synthesized human speech, said warning device comprising:
   means for generating a warning signal corresponding to a condition interferring with the proper operation of a camera;
   power supply means which is caused to operate only by said warning signal;
   an amplifier which is adapted to receive electric power through said power supply means;
   means for delaying said warning signal a predetermined period of time which is equal to the time which is required for the amplifier to attain a desired amplification factor;
   an acoustic signal generating circuit for generating synthesized acoustic signals convertible into a statement in synthesized human speech upon receiving said delayed warning signal, said synthesized acoustic signals being then directed to said amplifier; and
   a speaker through which said synthesized acoustic signals from said amplifier is imparted as a warning statement in synthesized human speech;
   said delaying means delaying said warning signal said predetermined period of time after said amplifier has received electric power, whereby said amplifier is powered said predetermined period of time prior to the generation of said synthesized acoustic signals.

2. A warning device as defined in claim 1, wherein further comprises a flip-flop circuit which is adapted to be set by said warning signal from said warning signal generating signal and to be reset by an end signal provided subsequent to said synthesized acoustic signals from said acoustic signals generating circuit, said flip-flop circuit directing said warning signal which is latched thereby to both said power supply means and said delay means upon being reset.

3. A warning device as defined in claim 2, wherein said delay means comprises a resistor and a capacitor.

4. A warning device as defined in claim 3, wherein said power supply means includes a first transistor which is rendered conductive upon receiving said warning signal and a second transistor connected in series to said amplifier which is rendered conductive upon said first transistor being rendered conductive so as to allow power supply to said amplifier.

5. A warning device as defined in claim 1, said acoustic signal generating circuit providing an end signal at the end of said synthesized human speech to switch off the power supply to the amplifier.

* * * * *